March 12, 1968  W. F. BRAUN  3,372,867
DATA INDICATING APPARATUS
Filed Aug. 31, 1966  2 Sheets-Sheet 1

INVENTOR:
Wilhelm F. BRAUN
BY:
Arthur O. Klein
ATTORNEY

INVENTOR:
Wilhelm F. BRAUN

United States Patent Office 3,372,867
Patented Mar. 12, 1968

3,372,867
DATA INDICATING APPARATUS
Wilhelm F. Braun, Haldenrain 6, Lucerne, Switzerland
Filed Aug. 31, 1966, Ser. No. 576,261
Claims priority, application Switzerland, Sept. 2, 1965,
12,376/65
9 Claims. (Cl. 235—61)

ABSTRACT OF THE DISCLOSURE

A calculating device comprising at least two plates which are movable with respect to each other. One of the two plates carries thereon logorithmic chart coordinates. The other plate has drawn thereon a plurality of straight parallel lines. The latter plate is rotatable with respect to the former plate, both plates being preferably made of plastic transparent material. This device permits the determination of exponential functions, as well as the determination of a P-value (price) as a function of any K-value (capacity) of a plant from a relationship and the exponent. The device, furthermore, furnishes the graphic representation of the relationship of the two values over the entire range of the logarithmic system.

Specification

This invention relates to data indicating apparatus and more particularly to devices which have one member adjustable relative to another for expressing equations or indicating the relationship of factors, for example, in algebraic or geometrical systems.

To determine, for instance, the percentage of waste in mass-produced goods by using a binomial system, a device is known which consists of a plate provided with a binomial system notation. Attached to the plate at the zero point provided in respect of the binomial system is a ruler which can be rotated and extends across the plate. The ruler is provided with a line coming from the zero point and with two lines spaced and parallel with respect thereto. The spacing corresponds to permissible tolerance. For the purpose of writing on the plate with a pencil, at least part of the surface of the plate provided with the binomial system is rough.

Exponential functions are frequently used in scientific calculations. Relatively new is the use of such functions in comparative calculations. It is known, for example, that the prices $P_0$ and $P_1$ of certain scientific equipment are like an exponential function of the quotient of the capacities of this equipment, namely:

$$\frac{P_1}{P_0} = \left(\frac{K_1}{K_0}\right)^x \text{ or } P_1 = P_0 \cdot \left(\frac{K_1}{K_0}\right)^x$$

The exponent $x$ differs, of course, for various kinds of scientific equipment, but remarkably, it is relatively constant for equipment of the same kind over a wide range of possible capacities.

For instance, the technical equipment for a sulphuric acid production unit having a daily capacity of two hundred tons was calculated at a price for six million price units, and for a daily capacity of four hundred tons for nine and one-tenth million price units. According to the above formula, the proportion corresponds to the exponent $x = .6$. Prices for smaller, larger and intermediate capacities can be calculated with this exponent. The relationship of the two magnitudes P and K cited in the example was computed logarithmically. This is very time-consuming and also complicated. Moreover, a tabulary compilation of a great number of bases and exponents would be voluminous and rather complex.

It is, in view of the above, an objective of the invention to provide a device which permits the determination of the exponent from two known relationships as well as the obtaining of a graphic representation of the function when the exponent and one relationship are known.

A device, according to a brief description of one embodiment of the invention for the calculation of exponential functions, involves the use of at least two superposed plates, one of which is equipped with a binomial system notation and the other with a straight line or several parallel straight lines. Preferably, the one plate disposed above the other plate consists of transparent material and the plate equipped with the straight line can be rotated with respect to the plate equipped with the binomial system notation around a point located on the straight line, as will be explained in greater detail hereinafter. The device is moreover characterized in that the plates are disposed in a frame and both the pivot point and the plate having the binomial system notation are movable relative to each other in such a manner that, after shifting, the coordinates of the binomial system notation run parallel to their original position and such that the frame or an additional plate which may be provided has an exponent scale.

In a prior art device, only a single relationship can be determined, provided the exponent is known. Even the determination of the exponent from two known relationships $(P:K)$ is impossible in one operation. The device according to the invention permits the determination of the exponent as well as the computation of a P value as a function of any K value from a relationship and the exponent. In addition, the device not only makes the result for one single new ratio $P:K$ known, but it also furnishes the graphic representation of the relationship of the two values over the entire range of the binomial system. Due to the use of parallel straight lines on the one plate, only an insignificant relative shifting of the two plates is required (e.g., perhaps by two cm. or less) to obtain the desired graphic representation.

Additional features will be found in the following detailed description of preferred embodiments of the invention as illustrated in the accompanying drawing in which.

Figure 1A:
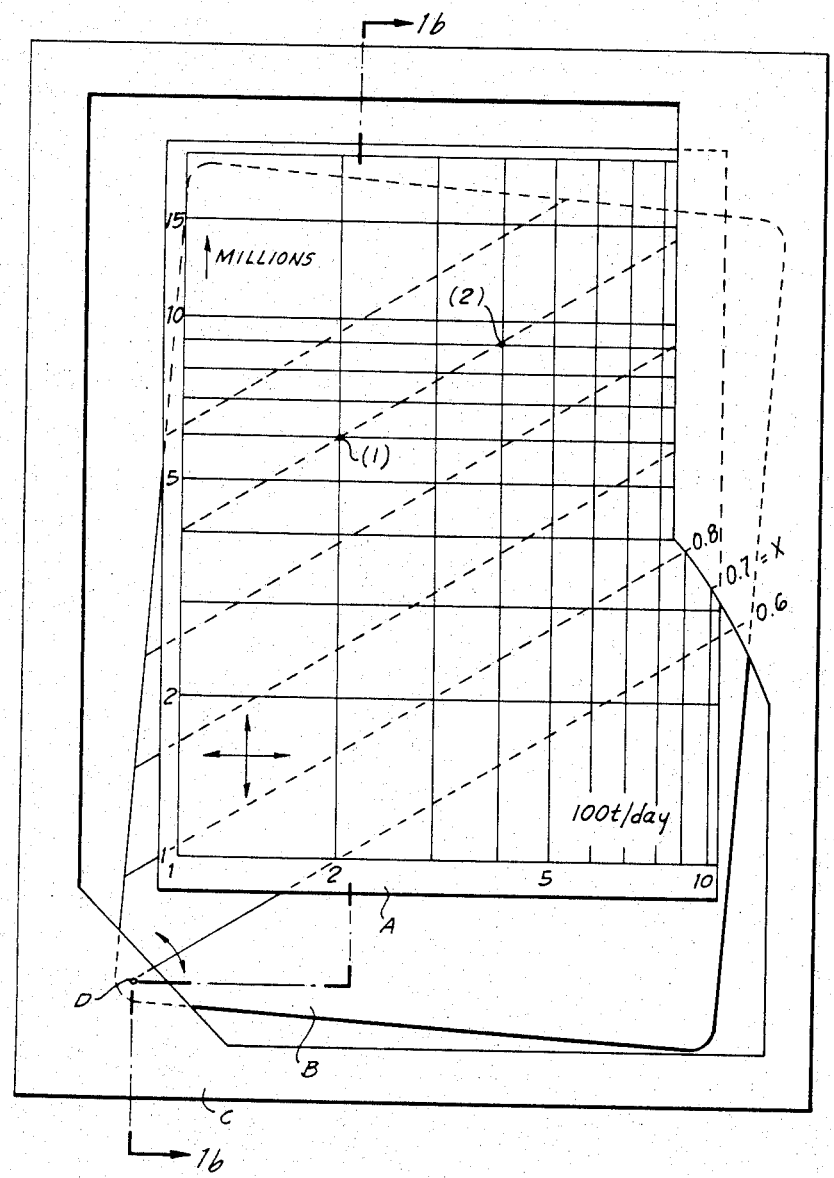
FIGURE 1a is a top view of one embodiment of the invention.
Figure 1B:
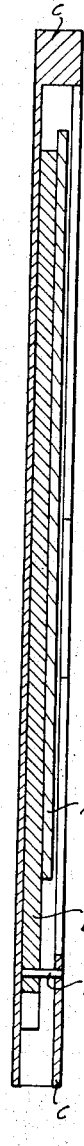
FIGURE 1b is a sectional view of the device of FIGURE 1a along line 1b—1b.
Figure 2A:
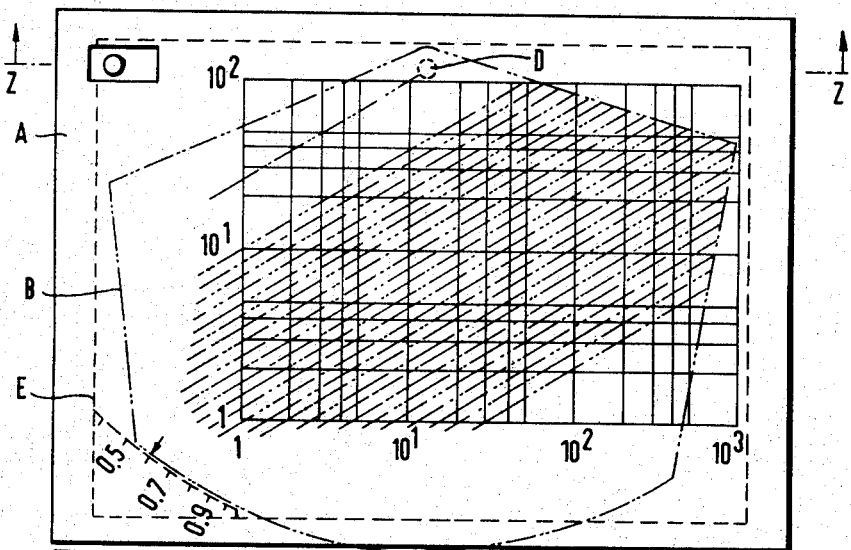
FIGURE 2a is a top view of another embodiment of the invention.
Figure 2B:
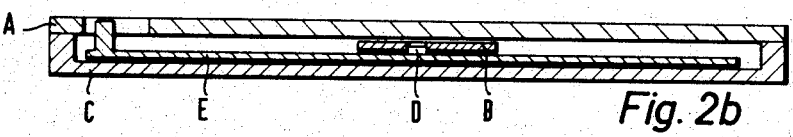
FIGURE 2b is a sectional view of the device of FIG. 2a along line Z—Z.

In FIG. 1a, element C is a frame in which plates A and B are each disposed. Plate A is a transparent plate which is provided with a binomial system notation which, for example, may be engraved into the plate. In the most simple case, transparent binomial paper with logarithmic chart coordinates thereon, is pasted to the surface of the plate away from the viewer. The surface of plate A facing the viewer is preferably slightly rough so that points in the coordinate system can easily be plotted, such as by pencil, and also be erased again. One of the two dependent values, in the implementation example the capacity in the range of interest, is plotted on the abscissa of the binomial system. The other dependent value, in the implementation example the prices, is plotted on the ordinate. Plate A can be shifted with respect to plate B, but only so that, after shifting, the two coordinates of the binomial system run parallel to their original position. If the correlated price values are known for two capacity values, the coordinate intersections 1 and 2 are plotted on the transparent plate A.

Plate B, disposed below plate A, is provided with at least one straight line, but preferably a plurality of straight parallel lines. Plate B can be rotated with respect to plate A around a pivot point D located on a straight line. The straight line points, as indicated by the arrow, to the exponent scale on frame C which corresponds to its inclination to the abscissa.

If plate B has only one straight line intersecting pivot point D, the shifting range of plate A must be fairly large for the straight line on plate B to intersect points 1 and 2 plotted on plate A. To limit the shifting range, and with it the size of the device, to a convenient size, the aforementioned plurality of straight lines is provided on plate B. All of them have the same inclination with respect to the abscissa and, therefore, correspond to the same exponent.

By shifting plate A, one straight line of the plurality of straight lines on plate B can be found which intersects both of points 1 and 2. This one straight line represents the relationship of the two values, capacity K and price P. Therefore, a multitude of correlated P and K values can immediately be read over the entire range of the decimal power of the binomial system.

Shifting of the two plates A and B relative to each other can also be accomplished if plate A is fixed in the frame and pivot point D of plate B is shiftable, preferably parallel to the coordinates of the binomial system.

The section line $1b$—$1b$ traverses the axis about which the plate B may be pivoted. The sectional view of FIG. $1b$ illustrates how the pivot D is arranged in the frame C. The plate A is mounted in plate C in such a manner that it may be moved only in the directions of the arrows shown in FIG. $1a$. The guiding means for plate A are well-known and have not been illustrated in detail.

Two known points of a known exponential function, for example points 1 and 2, represent the costs in millions of dollars for constructing two manufacturing plants of the same type but of different output capacities. By manipulating plate A in the direction of the arrows and pivoting plate B about pivot support D one of the parallel lines on plate B can be made to coincide with the points 1 and 2. This parallel line represents the relationship for all other capacities and costs for manufacturing plants of the same type. The parallel line which traverses the point D simultaneously indicates the exponent for the function, which is 0.6 in the described example.

The arrangement of the plates on one another can also be provided in reversed order so that plate B is disposed on top of plate A. In such case, it is recommended that a cover plate be stationarily connected to frame C, such cover plate being of transparent material and having a rough surface facing the viewer. Plate B is then also made of transparent material. A problem could be solved with the device illustrated in FIGS. $1a$ and $1b$ as follows:

Let us assume that a plant having a capacity of 20 tons per day costs 6 million dollars and another similar plant having a capacity of 40 tons per day costs 9 million dollars. The capacities are indicated on the abscissa axis up to 100 tons per day and on the ordinate axis the prices are indicated up to 15 million dollars on the disc A. The afore-described example is entered on the coordinate system as follows: 6 million dollars for a 20 ton per day capacity results in point 1, 3 million dollars for a 40 ton per day capacity results in point 2.

Disc A is slidably displaceable (in the direction of the arrows) parallel to coordinate axes. Disc B can be rotated (in the direction of the arrow) about the axis D. By manipulating both discs as described above, they can be positioned so that one of the parallel lines on disc B intersects both points 1 and 2 on the disc A. This parallel line indicates also for all other capacities the corresponding prices (that is when the exponent factor X remains constant). Thus, for example, a plane having a capacity of 30 tons per day costs about 7.7 million dollars. The parallel line which intersects the axis 1 indicates, on the scale affixed on the frame 6, the exponent which in the given example is equal to $X = 0.6$.

Since FIG. $1a$ is only supposed to illustrate the operative principle of the invention, only rounded values are illustrated. The details of construction, for example the slidable arrangement for the disc A is not illustrated.

Only two of the parallel straight lines on disc B are of significance namely: the line intersecting points 1 and 2, and the line intersecting the axis D.

According to the example illustrated in FIGS. $2a$ and $2b$, the transparent plate A having the binomial system is stationarily connected to flat frame C. Between the bottom of the frame and plate A, an additional plate E is disposed which, for example, is shiftable in parallel to one of the coordinates of the binomial system. Plate E carries pin D for the rotation of plate B. It also carries the exponent scale. Plate B with its parallel straight lines turns around pin D on plate E.

In another advantageous embodiment of the invention, tolerances can be considered in the event that but one relationship is known and the computation is based on but one approximate exponent. For this purpose, the plate having the plurality of parallel straight lines is additionally equipped with tolerance lines. These tolerance lines can, however, be alternatively plotted on an additional plate which can rotate together with the plate having the parallel straight lines and which, in addition, is adapted for shifting in the direction of the parallel lines and/or in direction of the coordinates of the binomial system.

Figure 3:
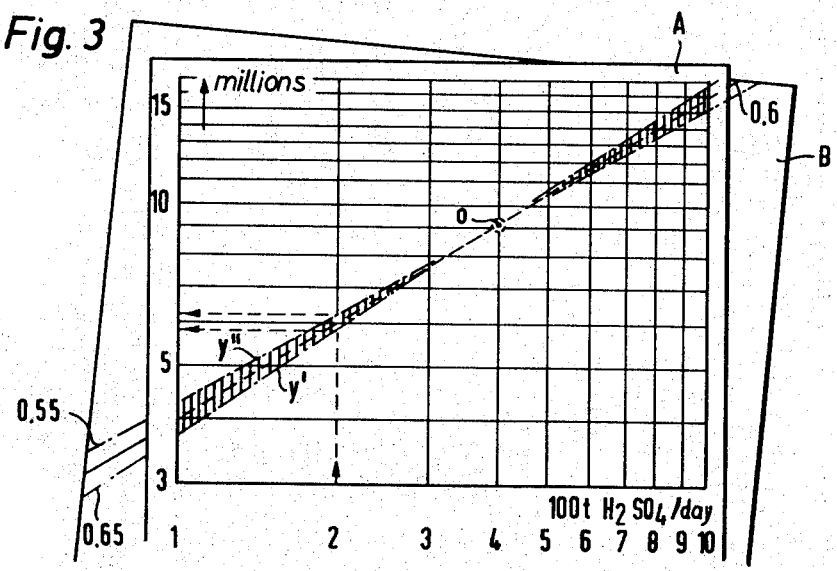
FIGURE 3 is a top view of another embodiment in respect of consideration of tolerances.

This is explained below and by FIG. 3 for a tolerance of $\pm .05$. The zero point is given by a known relation. Through it runs one of the parallel straight lines whose inclination corresponds to an approximate exponent of say .6. The two tolerance lines $y'$ and $y''$ intersecting the zero point include a shaded area which corresponds to the aforementioned tolerance of $\pm .05$. For a capacity value of 200 $t$, the correlated price value of the installation would lie in a range from 5.8 to 6.2 million price units.

By making the respective parts of the device of transparent material as indicated above, the possibility of making copies is given so that the exponent found and the relationship of the two values resulting therefrom and plotted on the coordinates of the binomial system can be recorded in the form of a document.

There will now be obvious to those skilled in the art many modifications of the above embodiments. Such modifications will come within the scope of the invention if defined by the following claims.

What is claimed is:

1. A calculating apparatus, comprising first means having coordinate system indicia for charting two related variables of an equation by locating at least one point of a series of points which form a line representing said equation and which has a slope with relation to said coordinate system indicia; second means having line indicia including at least one second line adapted to be aligned with at least one point of said series of points; and third means supporting said first and second means in such a way that at least said first and second means are slidably and guidably movable with respect to each other, and pivotally guidably movable with respect to each other, so that said second line of said line indicia may be manually aligned with said line representing said equation on said coordinate system indicia, thereby said one point on said coordinate system indicia and said second line of said line indicia are visually related by manipulation of said first and second means and said line representing said equation can thereby be determined.

2. Apparatus as claimed in claim 1, wherein the system is a binomial system and said first means provides a logarithmic chart and said line indicia comprises a plurality of straight lines, one of said means including indicator means to indicate the slope of said lines and thus the exponent of said equation.

3. Apparatus as claimed in claim 2, wherein at least one of said first and second means is transparent and provided with a rough surface upon which to write.

4. Apparatus as claimed in claim 2, wherein said second means has a plurality of further lines parallel to and adjustable with said one second line.

5. Apparatus as claimed in claim 2, wherein said second means is further provided with lines indicating tolerances.

6. Apparatus as claimed in claim 2, wherein said chart includes coordinates and said second means is displaceable in such manner in said third means as to maintain said coordinates parallel to their original positions.

7. Apparatus as claimed in claim 2, wherein said third means is a flat frame and said first means includes a transparent cover plate fixed on and defining a chamber with said frame and a displaceable plate in said chamber and provided with said chart, said plates cooperatively including and being provided with a pin and slot arrangement whereby the displaceable plates can be guidably and limitably displaced relative to said cover plate, and pivot means on said displaceable plate, said second means including a plate provided with said line indicia and pivotally supported by said pivot means.

8. Apparatus as claimed in claim 2, wherein said third means is a frame having an opening through which said first and second means are displayed and wherein said frame includes a portion constituting said indicator means, the indicator means having slope indicating indices, said second means partly underlying said portion so that said one second line can be manipulated to extend below said indices which thus indicate the slope of said one second line of said line indicia.

9. Apparatus as claimed in claim 2, wherein said third means is a frame having an opening through which said first and second means are displayed and wherein said frame includes a portion constituting said indicator means, the indicator means having slope indicating indices, said second means abutting said portion and having an index cooperating with said indices to indicate the slope of said second one line.

References Cited

UNITED STATES PATENTS

| 1,937,831 | 12/1933 | McCollum | 325—61 |
| 2,295,616 | 9/1942 | Williamson | 235—61 |
| 2,418,803 | 4/1947 | Etherington | 235—61 |
| 2,800,279 | 7/1957 | Hekster | 235—61 |
| 3,026,031 | 3/1962 | Jones | 235—61 |

FOREIGN PATENTS

| 1,098,319 | 3/1955 | France. |
| 634,220 | 8/1936 | Germany. |

RICHARD B. WILKINSON, *Primary Examiner.*

S. A. WAL, *Assistant Examiner.*